United States Patent
Yi et al.

(10) Patent No.: US 8,636,400 B2
(45) Date of Patent: Jan. 28, 2014

(54) DISPLAY DEVICE

(75) Inventors: Sangmin Yi, Yongin (KR); DongWan Choi, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 202 days.

(21) Appl. No.: 13/137,954

(22) Filed: Sep. 22, 2011

(65) Prior Publication Data

US 2012/0182718 A1    Jul. 19, 2012

(30) Foreign Application Priority Data

Jan. 19, 2011    (KR) .................. 10-2011-0005570

(51) Int. Cl.
*F21V 7/04*    (2006.01)
(52) U.S. Cl.
USPC .......................... 362/616; 362/601; 362/623
(58) Field of Classification Search
USPC ............ 362/600–629; 349/61–65, 67–68, 70
See application file for complete search history.

(56) References Cited

FOREIGN PATENT DOCUMENTS

| KR | 10-2000-0003309 A | 1/2000 |
| KR | 10-2002-0090453 A | 12/2002 |
| KR | 10-2009-0053631 A | 5/2009 |

*Primary Examiner* — Jason Moon Han
(74) *Attorney, Agent, or Firm* — Lee & Morse, P.C.

(57) ABSTRACT

A display device includes first and second display panels, a first backlight assembly including a first light source that emits first light and a first reflective sheet that reflects the first light, and a second backlight assembly including a second light source that emits second light. A chromaticity coordinate region of the second light is different from a chromaticity coordinate region of the first light. The second backlight also assembly includes a second reflective sheet that reflects the second light and includes a second material different from a first material of the first reflective sheet. The first reflective sheet reflects the first light as third light toward the first display panel, and the second reflective sheet reflects the second light as fourth light toward the second display panel. A chromaticity coordinate region of the third light and a chromaticity coordinate region of the fourth light are substantially the same.

13 Claims, 10 Drawing Sheets

DISPLAY DEVICE

CROSS-REFERENCE TO RELATED APPLICATIONS

This U.S. non-provisional patent application claims priority under 35 U.S.C. §119 of Korean Patent Application No. 10-2011-0005570, filed on Jan. 19, 2011, the entire contents of which are hereby incorporated by reference.

BACKGROUND

With the development of light, slim, and low-power consuming display devices, display devices are widely used in small electronic devices such as cellular phones and personal digital assistants (PDAs) as well as televisions and computers. As display devices are widely used for various electronic devices in various industrial fields, there has been increasing demand for highly-reliable display devices.

SUMMARY

Embodiments may be realized by providing display devices including first and second display panels adjacent to each other; a first backlight assembly including a first light source configured to emit first light and a first reflective sheet configured to reflect the first light; and a second backlight assembly including a second light source configured to emit second light and a second reflective sheet configured to reflect the second light and including a material different from a material of the first reflective sheet, wherein the first reflective sheet reflects the first light as third light toward the first display panel, and the second reflective sheet reflects the second light as fourth light toward the second display panel.

In some embodiment, a chromaticity coordinate region of the second light may be different from a chromaticity coordinate region of the first light.

In other embodiment, a chromaticity coordinate region of the third light and a chromaticity coordinate region of the fourth light may be substantially the same.

In still other embodiments, the first display panel may include a first thin film transistor substrate and a first color filter substrate on the first thin film transistor substrate, and the second display panel may include a second thin film transistor substrate and a second color filter substrate on the second thin film transistor substrate, wherein the first and second color filter substrates may include color filters formed of the same material.

In even other embodiments, the chromaticity coordinate region of the first light may be different from the chromaticity coordinate region of the third light, and the chromaticity coordinate region of the second light may be different from the chromaticity coordinate region of the fourth light.

In yet other embodiments, the chromaticity coordinate region of the first light may be substantially equal to the chromaticity coordinate region of the third light, and the chromaticity coordinate region of the second light may be different from the chromaticity coordinate region of the fourth light.

In further embodiments, the display device may further includes a third display panel adjacent to the first and second display panels; and a third backlight assembly including a third light source configured to emit fifth light and a third reflective sheet configured to reflect the fifth light, wherein the third reflective sheet reflects the fifth light as six light toward the third display panel, and the third reflective sheet includes a material different from the material of at least one of the first and second reflective sheets.

In still further embodiments, the fifth light may have a chromaticity coordinate region different from the chromaticity coordinate region of at least one of the first light and the second light, and the third light, the fourth light, and the six light may have substantially the same chromaticity coordinate region.

In even further embodiments, the first display panel may include a first thin film transistor substrate and a first color filter substrate on the first thin film transistor substrate, the second display panel may include a second thin film transistor substrate and a second color filter substrate on the second thin film transistor substrate, and the third display panel may include a third thin film transistor substrate and a third color filter substrate on the third thin film transistor substrate, wherein the first, second, and third color filter substrates may include color filters formed of the same material.

In yet further embodiments, the first and second light sources may include an LED (light emitting diode).

In yet further embodiments, the first backlight assembly may include a first light guide plate configured to guide the first light toward the first display panel and a first optical sheet disposed above the first light guide plate, and the second backlight assembly may include a second light guide plate configured to guide the second light toward the second display panel and a second optical sheet disposed above the second light guide plate, wherein the first light guide plate may be disposed between the first reflective sheet and the first optical sheet, and the second light guide plate may be disposed between the second reflective sheet and the second optical sheet.

Embodiments may also be realized by providing first and second display panels adjacent to each other; a first backlight assembly including a first light source configured to emit first light and a first reflective sheet configured to reflect the first light toward the first display panel; and a second backlight assembly including a second light source configured to emit second light and a second reflective sheet configured to reflect the second light toward the second display panel, wherein reflectivity of the first reflective sheet for the first light in a predetermined wavelength band may be greater than reflectivity of the second reflective sheet for the second light in the predetermined wavelength band.

In some embodiments, intensity of the first light in the predetermined wavelength band may be weaker than intensity of second light in the predetermined wavelength band.

In other embodiments, the predetermined wavelength band may be included in a visible wavelength band.

In still other embodiments, intensities of the reflected first light and the reflected second light in the predetermined wavelength band may be substantially equal.

In even other embodiments, the reflectivity of the first reflective sheet may be substantially equal to the reflectivity of the second reflective sheet in the other wavelength band except for the predetermined wavelength band.

BRIEF DESCRIPTION OF THE DRAWINGS

The accompanying drawings are included to provide a further understanding of the embodiments, and are incorporated in and constitute a part of this specification. Features will become apparent to those of ordinary skill in the art by describing in detail exemplary embodiments with reference to the attached drawings in which.

DETAILED DESCRIPTION

Figure 1:
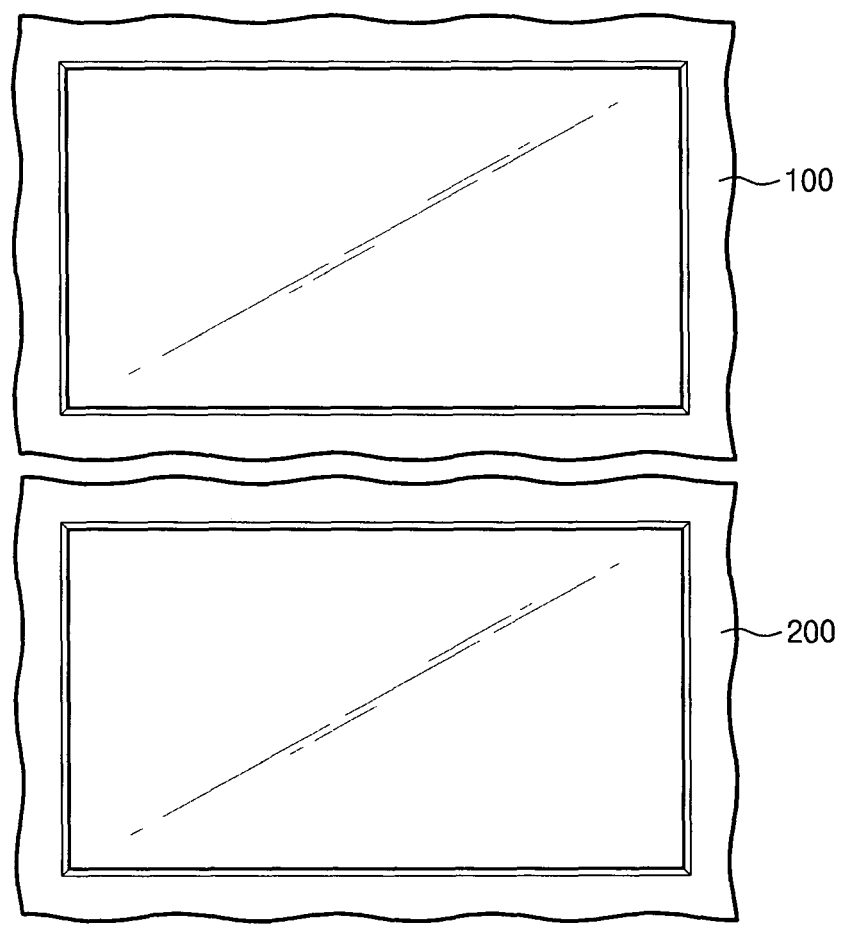
FIG. 1 is a view illustrating a display device, according to an exemplary embodiment.

Exemplary embodiments will be described below in more detail with reference to the accompanying drawings; however, they may be embodied in different forms and should not be construed as limited to the embodiments set forth herein. Rather, these embodiments are provided so that this disclosure will be thorough and complete, and will fully convey the scope of the inventive concept to those skilled in the art.

In the drawings, the thicknesses of layers and regions are exaggerated for clarity. Also, though terms like a first, a second, and a third are used to describe various regions and layers in various embodiments of the inventive concept, the regions and the layers are not limited to these terms. These terms are used only to discriminate one region or layer from another region or layer. An embodiment described and exemplified herein includes a complementary embodiment thereof. Like reference numerals refer to like elements throughout.

A display device will now be described according to exemplary embodiments.

Figure 2A:
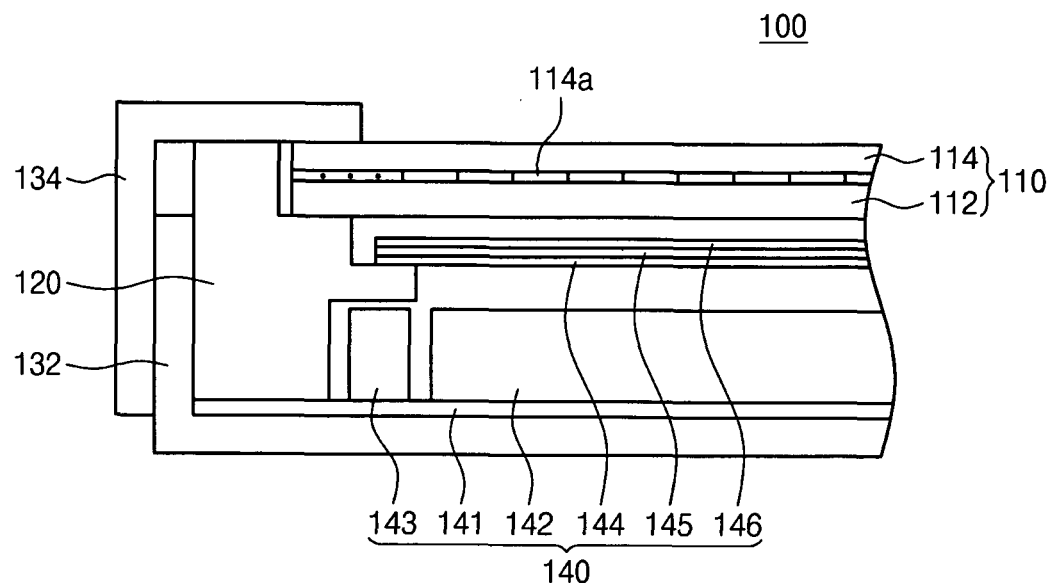
FIGS. 2A and 2B are sectional views illustrating a first display device and a second display device of the display device, according to an exemplary embodiment.
Figure 2B:
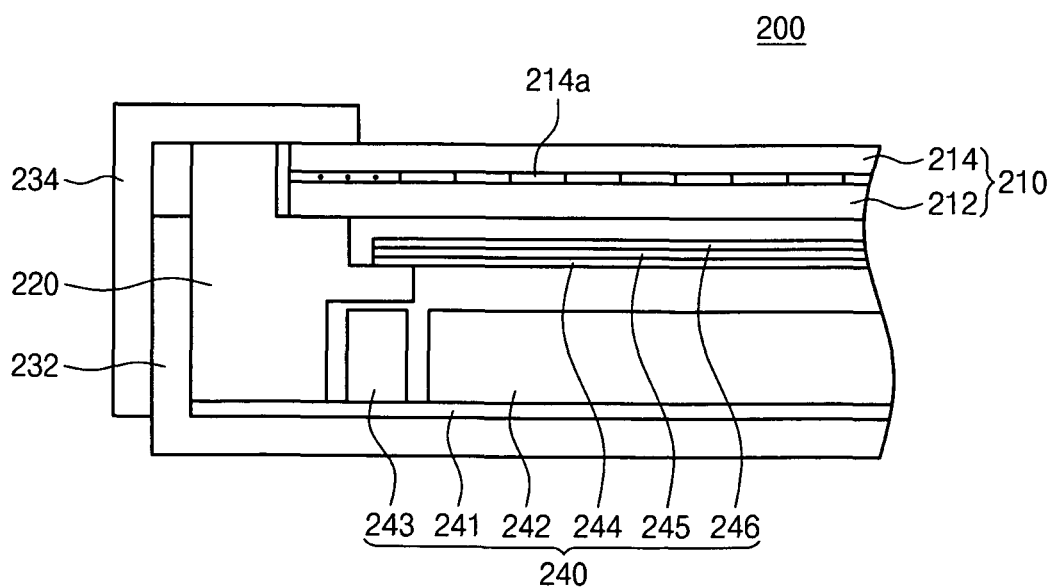

FIG. 1 is a view illustrating a display device according to an exemplary embodiment, and FIGS. 2A and 2B are sectional views illustrating a first display device and a second display device of the display device according to the exemplary embodiment.

Referring to FIGS. 1, 2A, and 2B, a display device 10 may include a first display device 100 and a second display device 200 adjacent to each other. The first and second display devices 100 and 200 may display first and second images, respectively. In an embodiment, the first and second images may be substantially identical. Alternatively, the first and second images may be different.

The first display device 100 may include a first display panel 110, a first mold frame 120, a first lower chassis 132, a first upper chassis 134, and a first backlight assembly 140.

The first display panel 110 may include a first lower substrate 112 and a first upper substrate 114. The first lower substrate 112 may be, e.g., a thin film transistor substrate that includes a plurality of gate lines extending in one direction, a plurality of data lines crossing the gate lines; and thin film transistors disposed at intersections of the gate lines and the data lines. The first upper substrate 114 may be, e.g., a color filter substrate that includes a plurality of first color filters 114a. The first display panel 110 may include a liquid crystal layer (not shown) between the first upper substrate 114 and the first lower substrate 112.

The first mold frame 120 may support the first display panel 110 and surround the first backlight assembly 140. The first mold frame 120 may be accommodated in at least one of the first lower chassis 132 and the first upper chassis 134.

The first backlight assembly 140 may include a first reflective sheet 141, a first light guide plate 142, a first light source 143, and a plurality of first optical sheets. The first light source 143 may emit a first light. The first light may be supplied to a lateral light entrance of the first light guide plate 142. The first light guide plate 142 may be disposed between the first reflective sheet 141 and the plurality of first optical sheets. In an embodiment, the first light source 143 may include a light emitting diode (LED). The first reflective sheet 141 may reflect first light toward the first display panel 110.

The plurality of first optical sheets may include a first diffusion sheet 144, a first prism sheet 145, and a first protection sheet 146. The first diffusion sheet 144 may diffuse first light incident from the first light guide plate 142. This may minimize generation of bright and dark lines from first light supplied to the first light guide plate 142. The first prism sheet 145 may collimate first light that is diffused by the first diffusion sheet 144. Therefore, bright light may be supplied to the first display panel 110. The first prism sheet 145 may include vertical and horizontal prism sheets for condensing incident light in vertical and horizontal directions, respectively. The first prism sheet 145 may protect the first backlight assembly 140, and thus, the first backlight assembly 140 may be not damaged by, e.g., scratching when the display device 10 is carried.

The second display device 200 may include a second display panel 210, a second mold frame 220, a second lower chassis 232, a second upper chassis 234, and a second backlight assembly 240.

The second display panel 210 may include a second lower substrate 212 and a second upper substrate 214. The second lower substrate 212 may be, e.g., a thin film transistor substrate. The second upper substrate 214 may be, e.g., a color filter substrate including a plurality of second color filters 214a. The second color filters 214a may be formed of the same materials as those used to form the first color filters 114a. The second display panel 210 may include a liquid crystal layer (not shown) between the second upper substrate 214 and the second lower substrate 212.

The second mold frame 220 may support the second display panel 210 and surround the second backlight assembly 240. The second mold frame 220 may be accommodated in at least one of the second lower chassis 232 and the second upper chassis 234.

The second backlight assembly 240 may include a second reflective sheet 241, a second light guide plate 242, a second light source 243, and a plurality of second optical sheets. The second light source 243 may emit a second light having a chromaticity coordinate region different from the chromaticity coordinate region of first light emitted from the first light source 143. The second light may be supplied to a lateral light entrance of the second light guide plate 242. The second light guide plate 242 may be disposed between the second reflective sheet 241 and the plurality of second optical sheets. In an embodiment, the second light source 243 may include an LED. The second reflective sheet 241 may reflect second light toward the second display panel 210. The plurality of second optical sheets may include a second diffusion sheet 244, a second prism sheet 245, and a second protection sheet 246.

The first reflective sheet 141 may reflect a third light toward the first display panel 110, and the second reflective sheet 241 may reflect a fourth light toward the second display panel 210. The third light may be the first light reflected by first reflective sheet 141, and the fourth light may be the second light reflected by the second reflective sheet 241.

As described above, the first and second light may have different chromaticity coordinate regions. The third light and fourth light reflected by the first and second reflective sheets 141 and 241, respectively, and incident on the first and second display panels 110 and 210, respectively, may have substantially the same chromaticity coordinate regions. Without intending to be bound by this theory, this may minimize an impression of a difference of a color between a first image displayed on the first display device 100 and a second image displayed on the second display device 200. This will now be explained with reference to FIG. 3A.

Figure 3A:
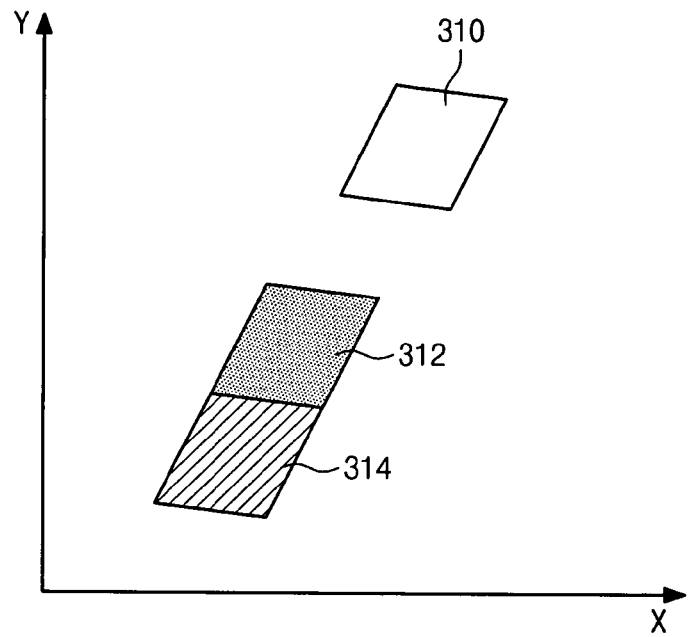
FIG. 3A is a graph showing chromaticity coordinates of light input to first and second display panels of the display device, according to an exemplary embodiment.

FIG. 3A is a graph showing chromaticity coordinates of light input to the first and second display panels 110 and 210 of the display device 10 according to the exemplary embodiment.

Referring to FIGS. 2A, 2B, and 3A, in a predetermined wavelength band, the intensity of the first light emitted from the first light source 143 may be weaker than the intensity of the second light emitted from the second light source 243. The predetermined wavelength band may be included in the visible wavelength band. The first light and the second light may have different chromaticity coordinate regions.

The first light may have a first chromaticity coordinate region 312. The second light may have a second chromaticity coordinate region 314 different from the first chromaticity coordinate region 312. In an embodiment, the intensity of first light may be weaker than the intensity of second light, in a short wavelength region of the visible wavelength band. In this case, the sensation of blue of the second light may be stronger than the sensation of blue of the first light. In an embodiment, the graph of FIG. 3A represents an exemplary CIE chromaticity diagram. Referring to FIG. 3A, the first chromaticity coordinate region 312 may be adjacent to the second chromaticity coordinate region 314 in the CIE chromaticity diagram without substantially overlapping each other.

The first reflective sheet 141 may reflect the first light toward the first display panel 110, and the second reflective sheet 241 may reflect the second light toward the second display panel 210. The first reflective sheet 141 and the second reflective sheet 241 may include different materials. For example, the first reflective sheet 141 may include polyethylene naphthalate, and the second reflective sheet 241 may include silver (Ag).

Since the first and second reflective sheets 141 and 241 may have different materials, the reflectivity of the first reflective sheet 141 for the first light in the predetermined wavelength band may be different from the reflectivity of the second reflective sheet 241 for the second light in the predetermined wavelength band. In an embodiment, the reflectivity of the first reflective sheet 141 for the first light in the predetermined wavelength band may be greater than the reflectivity of the second reflective sheet 241 for the second light in the predetermined wavelength band. In the other regions of the visible wavelength band except for the predetermined wavelength band, the reflectivity of the first reflective sheet 141 may be substantially equal to the reflectivity of the second reflective sheet 241.

Since the first and second reflective sheets 141 and 241 may have different materials, the absorptivity of the first reflective sheet 141 for the first light in the predetermined wavelength band may be different from the absorptivity of the second reflective sheet 241 for the second light in the predetermined wavelength band. In an embodiment, the absorptivity of the first reflective sheet 141 for the first light in the predetermined wavelength band may be lower than the absorptivity of the second reflective sheet 241 for the second light in the predetermined wavelength band. In the other regions of the visible wavelength band except for the predetermined wavelength band, the absorptivity of the first reflective sheet 141 may be substantially equal to the absorptivity of the second reflective sheet 241.

Owing to, e.g., the difference between the reflectivity and absorptivity of the first reflective sheet 141 for the first light and the reflectivity and absorptivity of the second reflective sheet 241 for the second light in the predetermined wavelength band, the third light reflected from the first reflective sheet 141 to the first display panel 110 may have substantially the same reference chromaticity coordinate region 310 as the fourth light reflected from the second reflective sheet 241 to the second display panel 210.

According to an exemplary embodiment, although the first and second light sources 143 and 243 may emit light having different chromaticity coordinate regions, the third and fourth light may have substantially the same chromaticity coordinate regions because the first and second reflective sheets 141 and 241 may have different materials. Accordingly, light having substantially the same chromaticity coordinate regions can be incident on the first display panel 110 and the second display panel 210. Therefore, although the first and second color filters 114a and 214a of the first and second display devices 100 and 200, respectively, may be formed of the same material, the color sensation difference between the first and second images displayed on the first and second display devices 100 and 200, respectively, may be minimized.

In addition, although lights having different chromaticity coordinate regions may be emitted from the first and second light sources 143 and 243 of the first and second display devices 100 and 200, respectively, of the display device 10, the color sensation difference of first and second images may be minimized. Therefore, the first and second display devices 100 and 200 may use light sources that emit light having a wide range of chromaticity coordinates. Thus, the manufacturing costs of light sources and the display device 10 may be reduced.

In the above-described exemplary embodiment, the chromaticity coordinate region 310 of the third light and the fourth light may be different from the first chromaticity coordinate region 312 of the first light and the second chromaticity coordinate region 314 of the second light. In another case, first light and third light may have the same chromaticity coordinate regions, and second light and fourth light may have different chromaticity coordinate regions. This will now be explained with reference to FIG. 3B.

Figure 3B:
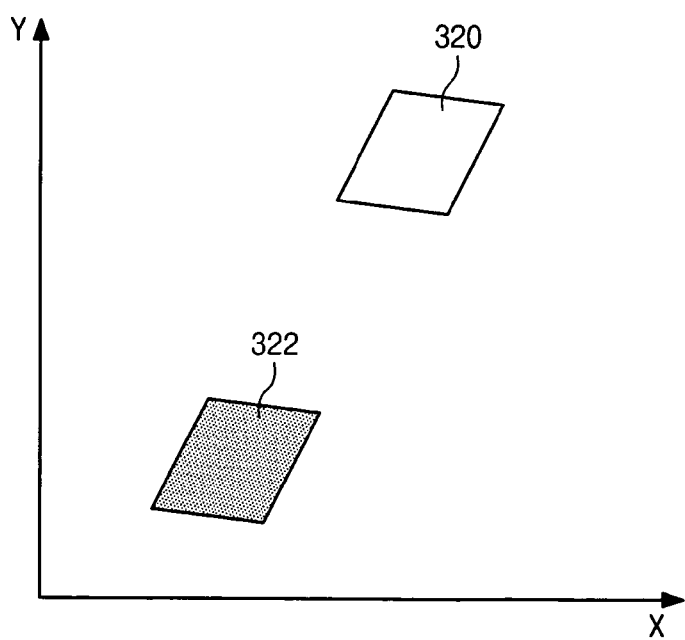
FIG. 3B is a graph showing chromaticity coordinates of light input to the first and second display panels of the display device, according to an exemplary embodiment.

FIG. 3B is a graph showing chromaticity coordinates of light input to the first and second display panels 110 and 210 of the display device 10 according to a modification of an exemplary embodiment.

Referring to FIGS. 2A, 2B, and 3B, the first and second display devices 100 and 200 of the display device 10 may be provided. In a predetermined wavelength band, the intensity of first light emitted from the first light source 143 may be weaker than the intensity of second light emitted from the second light source 243. The first light and the second light may have different chromaticity coordinate regions. The first light may have a first chromaticity coordinate region 320. The second light may have a second chromaticity coordinate region 322 different from the first chromaticity coordinate region 320. The graph of FIG. 3B represents an exemplary CIE chromaticity diagram. Referring to FIG. 3B, the first chromaticity coordinate region 320 may be spaced apart from the second chromaticity coordinate region 322 in the CIE chromaticity diagram without overlapping each other.

Since the first and second reflective sheets 141 and 241 may have different materials, the reflectivity and absorptivity of the first reflective sheet 141 may be different from the reflectivity and absorptivity of the second reflective sheet 241 according to wavelength bands.

According to wavelength bands, the reflectivity and absorptivity of the first reflective sheet 141 for the first light may be substantially constant. In this case, the first light may have substantially the same chromaticity coordinate region before and after being reflected. Third light incident on the first display panel 110 may have the first chromaticity coordinate region 320. The third light may be the first light reflected from the first reflective sheet 141.

According to wavelength bands, the reflectivity of the second reflective sheet 241 for the second light may be varied. For example, the reflectivity of the second reflective sheet 241 for the predetermined wavelength band of the second light may be lower than the reflectivity of the second reflective sheet 241 for the other wavelength bands of the second light. The other wavelength bands may be the visible wavelength band except for the predetermined wavelength band. The absorptivity of the second reflective sheet 241 for the predetermined wavelength band of the second light may be greater than the absorptivity of the second reflective sheet 241 for the other wavelength bands of the second light. In this case, fourth light incident on the second display panel 210 may have a chromaticity coordinate region different from that of the second light. The fourth light may be the second light reflected from the first reflective sheet 141. The fourth light may have substantially the same chromaticity coordinate region as the first chromaticity coordinate region 320. Therefore, although the first and second light sources 143 and 243 may emit light having different chromaticity coordinate regions, light having substantially the chromaticity coordinate regions may be incident on the first and second display panels 110 and 210.

In the above-described embodiments, the display device 10 includes the first and second display devices 100 and 200. In another embodiment, the display device 10 may further include a third display device. This will now be described with reference to FIGS. 4 and 5.

Figure 4:
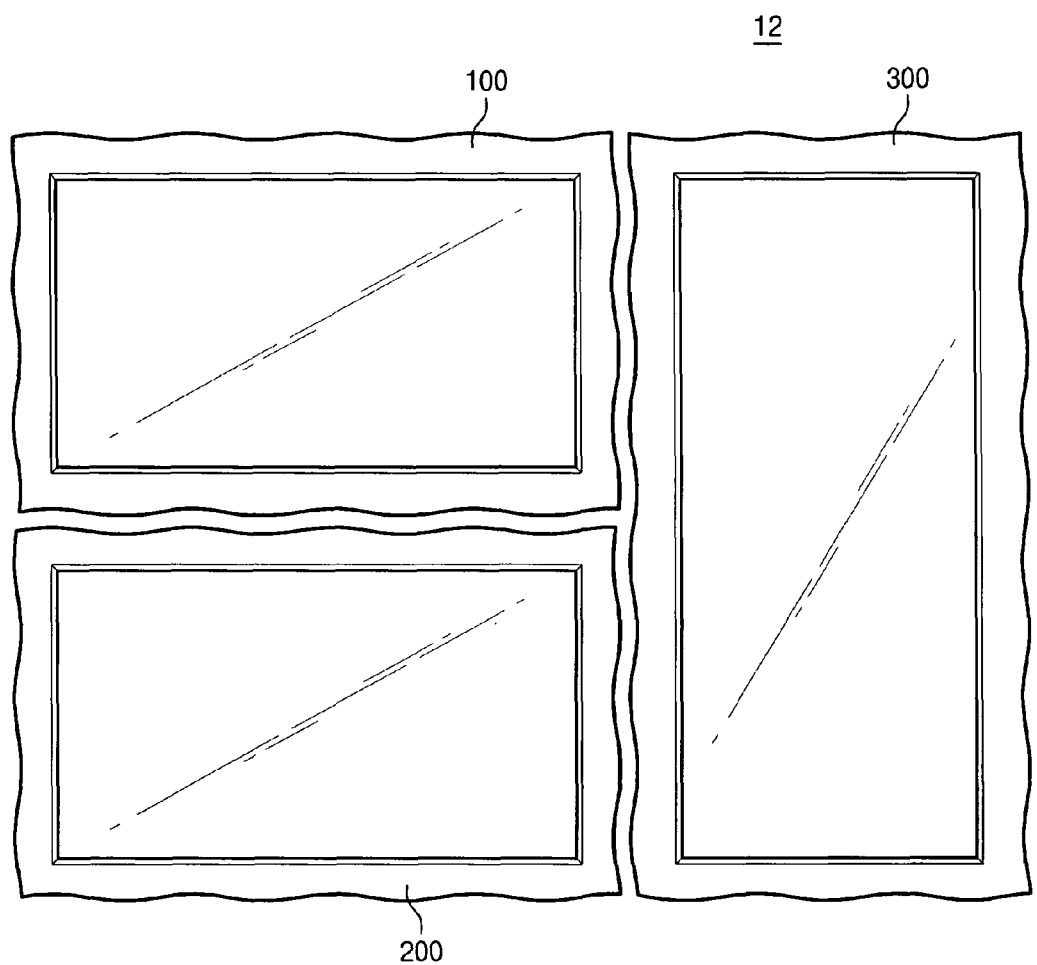
FIG. 4 is a view illustrating a display device, according to an exemplary embodiment.
Figure 5:
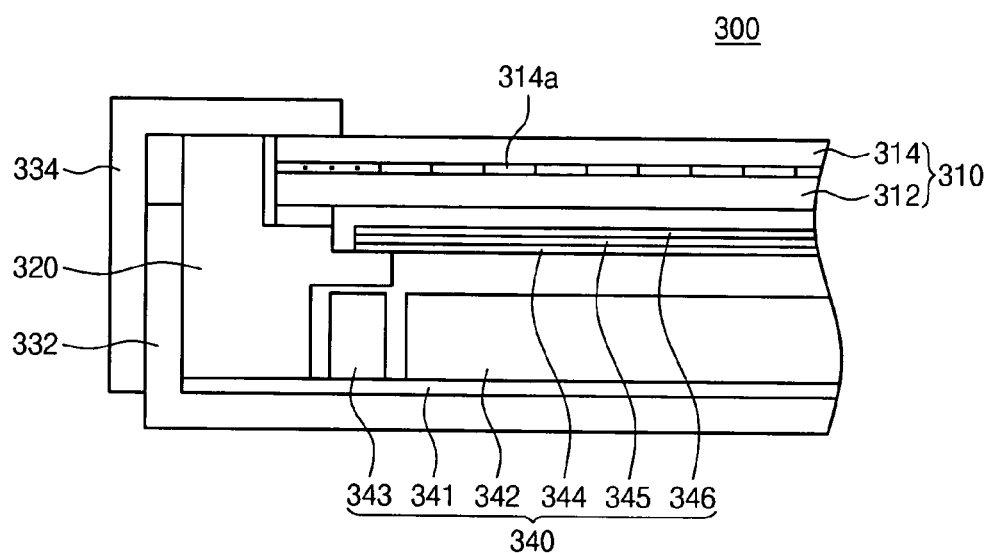
FIG. 5 is a sectional view illustrating a third display device of the display device, according to an exemplary embodiment.

FIG. 4 is a view illustrating a display device according to another exemplary embodiment, and FIG. 5 is a sectional view illustrating a third display device of the display device according to the exemplary embodiment.

Referring to FIGS. 4 and 5, a display device 12 may include the first and second display devices 100 and 200 described with reference to FIGS. 1, 2A, and 2B. The display device 12 may further include a third display device 300. The third display device 300 may include a third display panel 310, a third mold frame 320, a third lower chassis 332, a third upper chassis 334, and a third backlight assembly 340.

The third display panel 310 may include a third lower substrate 312 and a third upper substrate 314. The third lower substrate 312 may be, e.g., a thin film transistor substrate. The third upper substrate 314 may be, e.g., a color filter substrate including a plurality of third color filters 314a. The third color filters 314a may be formed of the same materials as those used to form the first and second color filters 114a and 214a. The third display panel 310 may include a liquid crystal layer (not shown) between the third upper substrate 314 and the third lower substrate 312.

The third mold frame 320 may support the third display panel 310 and surround the third backlight assembly 340. The third mold frame 320 may be accommodated in the third lower chassis 332 and the third upper chassis 334.

The third backlight assembly 340 may include a third reflective sheet 341, a third light guide plate 342, a third light source 343, and a plurality of third optical sheets. The plurality of third optical sheets may include may include a third diffusion sheet 344, a third prism sheet 345, and a third protection sheet 346. The third light source 343 may emit fifth light. The fifth light may have a chromaticity coordinate region different from those of the first light and the second light emitted from the first and second light sources 143 and 243, respectively, described with reference to FIGS. 2A and 2B.

The fifth light may be supplied to a lateral light entrance of the third light guide plate 342. The third light guide plate 342 may be disposed between the third reflective sheet 341 and the plurality of third optical sheets. In an embodiment, the third light source 343 may include an LED. The third reflective sheet 341 may reflect the fifth light toward the third display panel 310. Sixth light which is fifth light reflected from the third reflective sheet 341 may be incident on the third display panel 310. The plurality of third optical sheets may include the third diffusion sheet 344, the third prism sheet 345, and the third protection sheet 346 sequentially stacked.

As described above, the first, second, and fifth light may have different chromaticity coordinate regions. However, the third, fourth, and sixth light reflected from the first, second, and third reflective sheets 141, 241, and 341, respectively, to the first, second, and third display panels 110, 210, and 310, respectively, may have substantially the same chromaticity coordinate regions. This may minimize an impression of a difference of a color among first to third images displayed on the first to third display devices 100, 200, and 300, respectively. This will now be explained with reference to FIG. 6.

Figure 6:
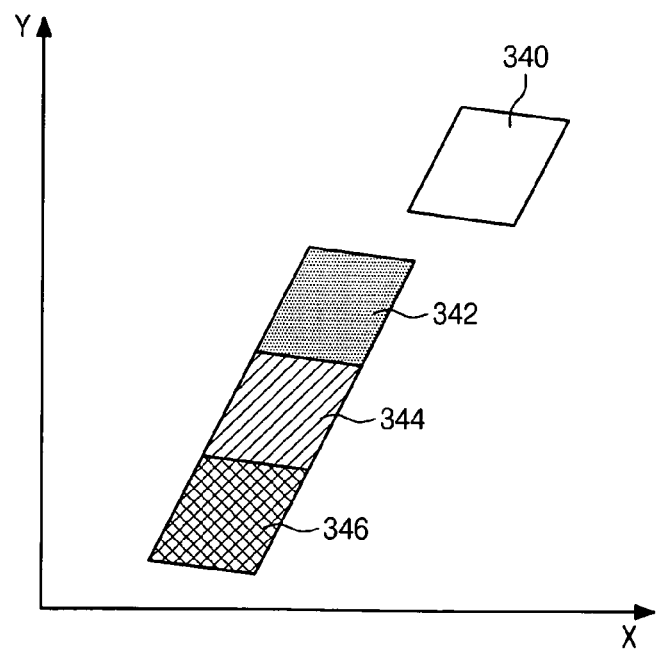
FIG. 6 is a graph showing chromaticity coordinates of light input to first to third display panels of the display device, according to an exemplary embodiment.

FIG. 6 is a graph showing chromaticity coordinates of light input to first to third display panels 100, 200, and 300 of the display device 12 according to the exemplary embodiment.

Referring to FIGS. 2A, 2B, 5, and 6, in a predetermined wavelength band, the intensity of the first light emitted from the first light source 143 may be weaker than the intensity of the second light emitted from the second light source 243. In the predetermined wavelength band, the intensity of the second light emitted from the second light source 243 may be weaker than the intensity of the fifth light emitted from the third light source 343. That is, the first, second, and fifth light may have different chromaticity coordinate regions.

The first light may have a first chromaticity coordinate region 342. The second light may have a second chromaticity coordinate region 344 different from the first chromaticity coordinate region 342. The fifth light may have a third chromaticity coordinate region 346 different from the first and second chromaticity coordinate regions 342 and 344.

The third light which is the first light reflected from the first reflective sheet 141 may be incident on the first display panel 110. The fourth light which is second light reflected from the second reflective sheet 241 may be incident on the second display panel 210. The sixth light which is the fifth light reflected from the third reflective sheet 341 may be incident on the third display panel 310. The first to third reflective sheets 141, 241, and 341 may include different materials.

Since the first to third reflective sheets 141, 241, and 341 have different materials, the reflectivity of each of the first to third reflective sheets 141, 241, and 341 for the first, second, and fifth lights, respectively, may be different from each other in the predetermined wavelength band. In an embodiment, the reflectivity of the first reflective sheet 141 for the first light in the predetermined wavelength band may be greater than the reflectivity of the second reflective sheet 241 for the second light in the predetermined wavelength band. The reflectivity of the second reflective sheet 241 for the second light in the predetermined wavelength band may be greater than the reflectivity of the second reflective sheet 241 for the fifth light in the predetermined wavelength band. In the other regions of the visible wavelength band except for the predetermined wavelength band, the reflectivity of the first to third reflective sheets 141, 241, and 341 may be substantially equal to each other.

Since the first to third reflective sheets 141, 241, and 341 have different materials, the absorptivity of each of the first to third reflective sheets 141, 241, and 341 for the first, second, and fifth lights, respectively, may be different from each other in the predetermined wavelength band. In an embodiment, the absorptivity of the first reflective sheet 141 for the first light in the predetermined wavelength band may be lower than the absorptivity of the second reflective sheet 241 for the second light in the predetermined wavelength band. The absorptivity of the second reflective sheet 241 for the second light in the predetermined wavelength band may be lower than the absorptivity of the third reflective sheet 341 for the fifth light in the predetermined wavelength band. In the other region of the visible wavelength band except for the predetermined wavelength band, the absorptivity of each of the first to third reflective sheets 141, 241, and 341 may be substantially equal to each other.

Owing to the differences among the reflectivity and absorptivity of each of the first to third reflective sheets 141, 241, and 341 for the first, second, and fifth lights, respectively, in the predetermined wavelength band, the third, fourth, and sixth lights reflected from the first to the third reflective sheets 141, 241, and 341, respectively, to the first to third display panels 110, 210, and 310, respectively, may have substantially the same chromaticity coordinate region 340.

Therefore, although the first to third light sources 143, 243, and 343 may emit lights having different chromaticity coordinates, lights having substantially the same chromaticity coordinate regions may be incident on the first to third display panels 110, 210, and 310. This may minimize an impression of a difference of a color among first to third images displayed on the first to third display devices 100, 200, and 300, respectively.

Experimental examples of the embodiments will now be explained.

Figure 7A:
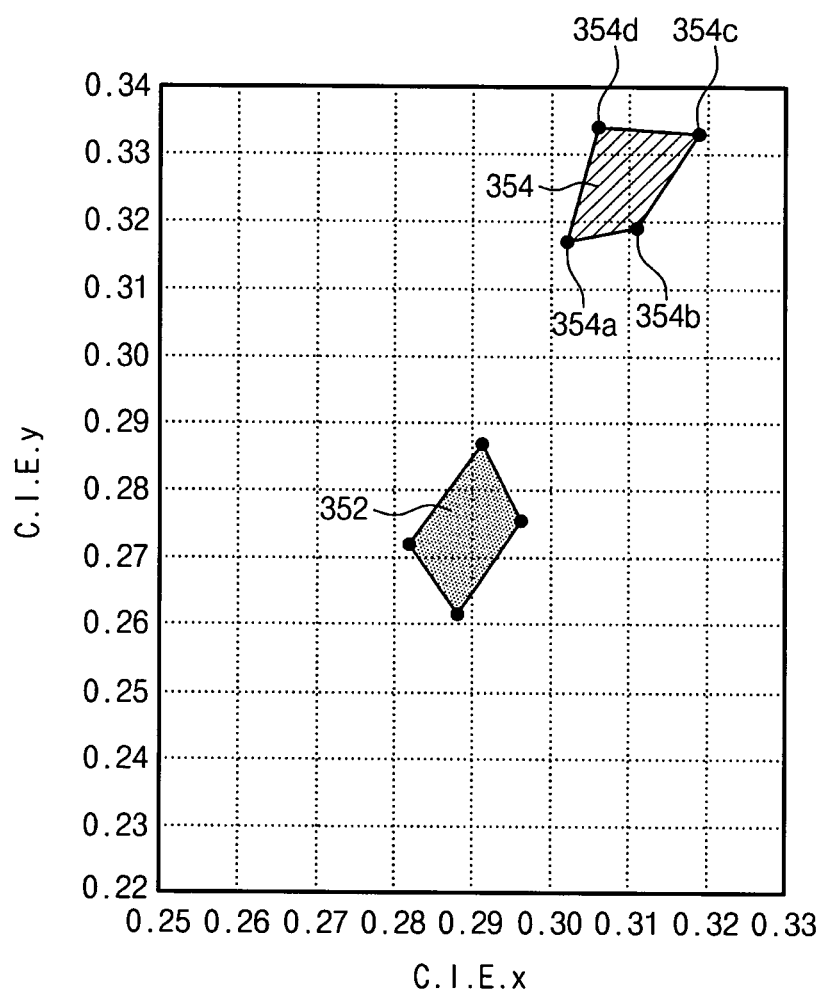
FIGS. 7A through 7C are CIE chromaticity graphs for explaining experimental examples, according to exemplary embodiments.
Figure 7B:
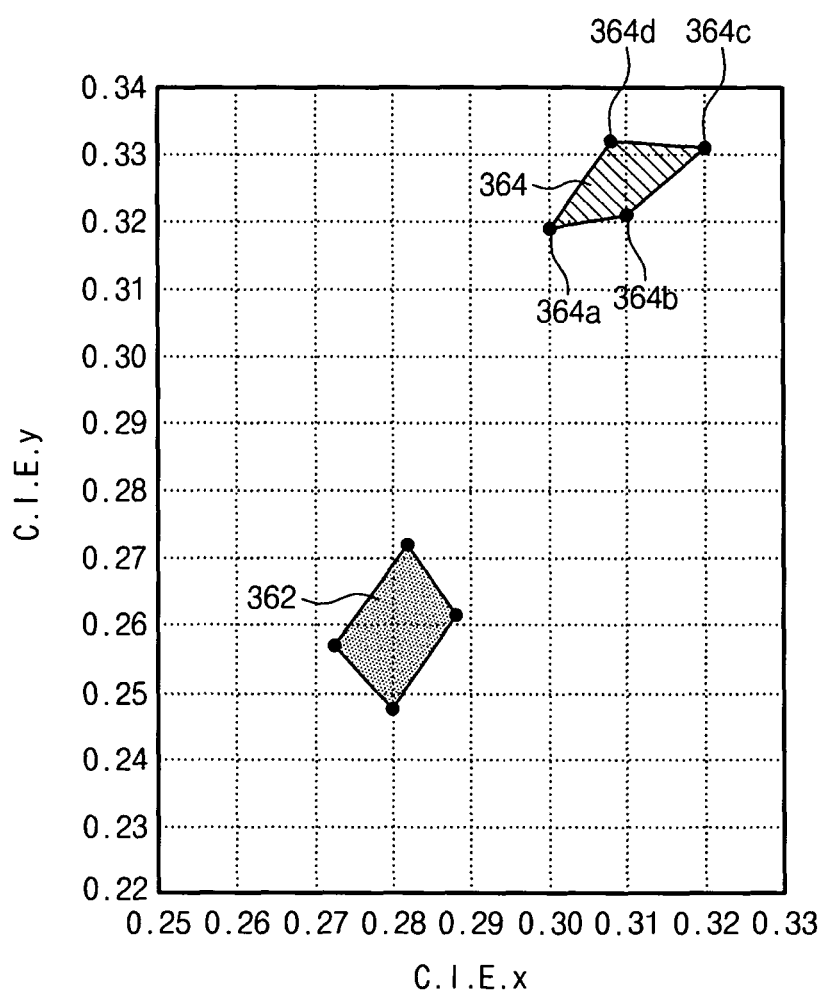
Figure 7C:
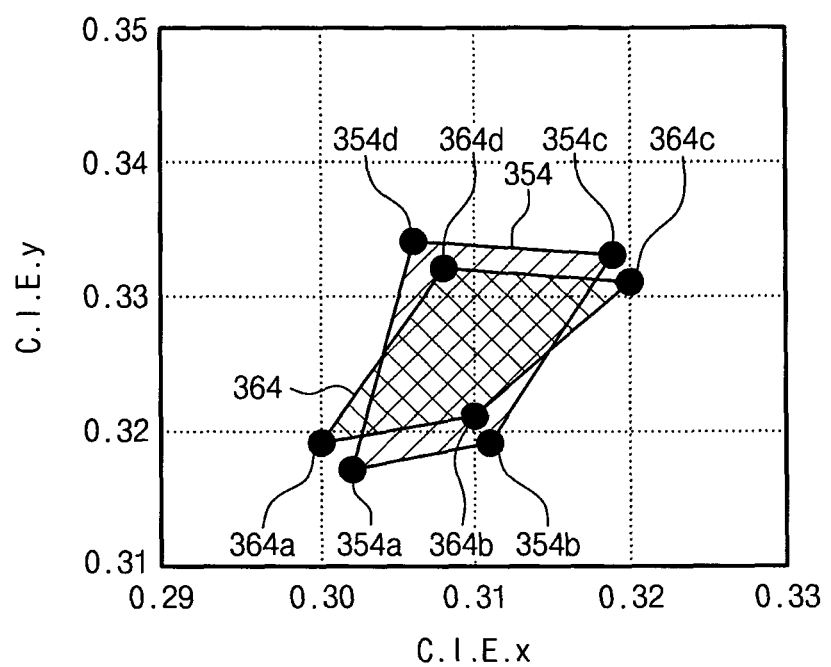

FIGS. 7A through 7C are CIE chromaticity graphs for explaining experimental examples of the embodiments. FIG. 7A shows a chromaticity coordinate region of first light emitted from a first light source of a first display device included in a display device according to the exemplary embodiments, and a chromaticity coordinate region of third light which is first light reflected by a first reflective sheet of the first display device. FIG. 7B shows a chromaticity coordinate region of second light emitted from a second light source of a second display device included in the display device according to the exemplary embodiments, and a chromaticity coordinate region of fourth light which is second light reflected by a second reflective sheet of the second display device. FIG. 7C shows the chromaticity coordinate regions of the third and fourth lights.

Referring to FIG. 7A, a first light having a first chromaticity coordinate region 352 may be emitted by the first light source of the first display device, according to an exemplary embodiment. The first reflective sheet of the first display device includes polyethylene naphthalate. Third light, which is the first light reflected by the first reflective sheet, has a third chromaticity coordinate region 354 different from the first chromaticity coordinate region 352 of the first light emitted from the first light source. The third chromaticity coordinate region 354 has a first point 354a (0.301, 0.317), a second point 354b (0.311, 0.319), a third point 354c (0.319, 0.333), and a fourth point 354d (0.306, 0.334).

Referring to FIG. 7B, a second light having a second chromaticity coordinate region 362, which is different from the first chromaticity coordinate region 352, is emitted by the second light source of the second display device, according to an exemplary embodiment. The second reflective sheet of the second display device includes silver (Ag). A fourth light, which is the second light reflected by the second reflective sheet, has a fourth chromaticity coordinate region 364 different from the second chromaticity coordinate region 362 of the second light emitted from the second light source. The fourth chromaticity coordinate region 364 has a first point 364a (0.300, 0.319), a second point 364b (0.310, 0.321), a third point 364c (0.320, 0.331), and a fourth point 364d (0.308, 0.332).

Referring to FIG. 7C, the maximum differences between the points of the third chromaticity coordinate region 354 and the points of the fourth chromaticity coordinate region 364 are 0.002 in the x axis and 0.002 in the y axis. That is, the third chromaticity coordinate region 354 and the fourth chromaticity coordinate region 364 are substantially equal.

Figure 8:
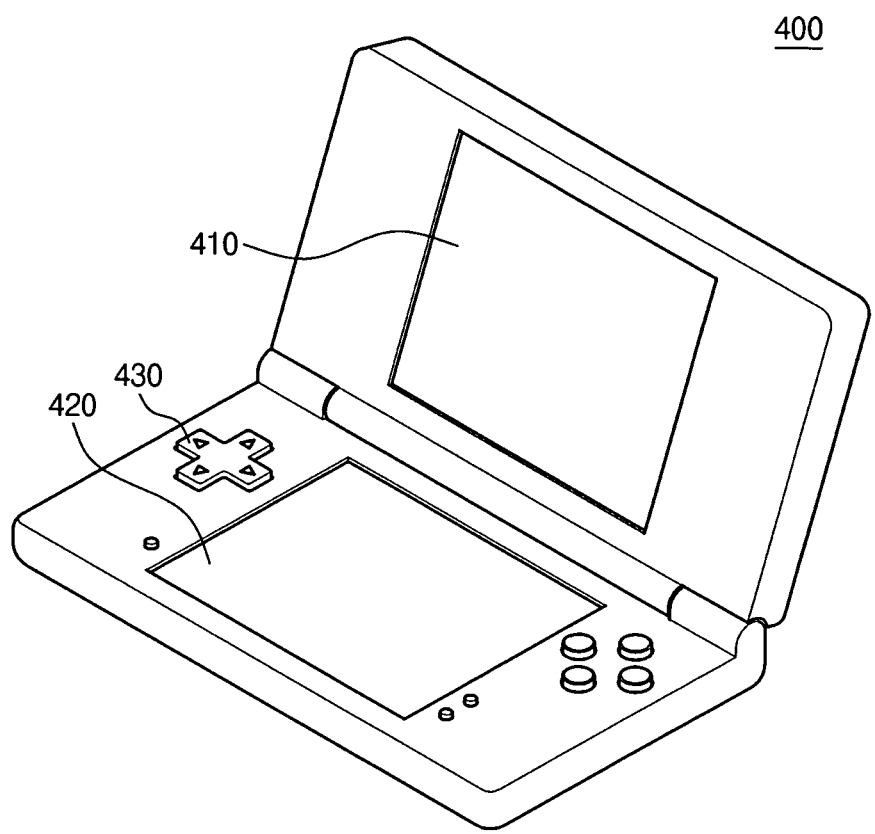
FIGS. 8 and 9 are views for illustrating electronic devices each including first and second display devices, according to exemplary embodiments.
Figure 9:
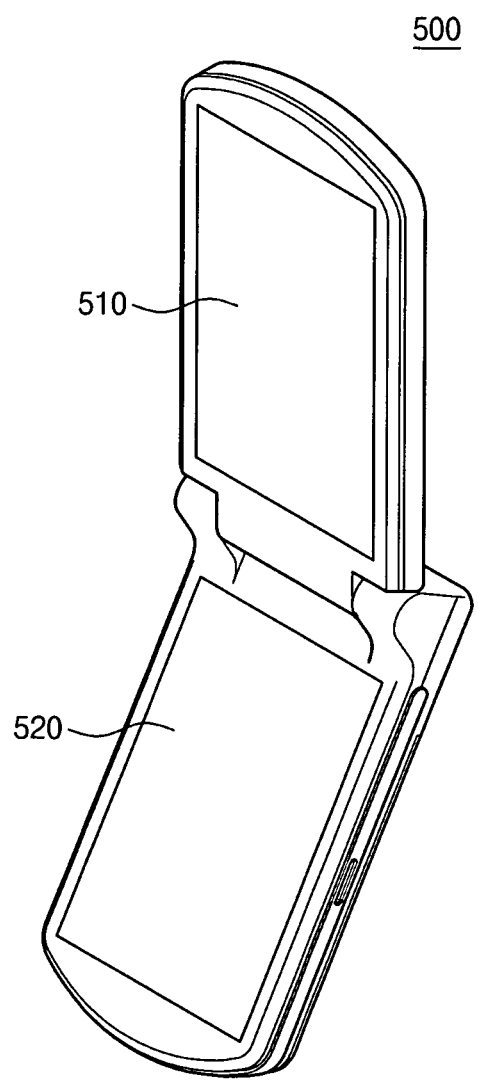

With reference to FIGS. 8 and 9, explanations will now be given on electronic devices including display devices according to the exemplary embodiments.

FIGS. 8 and 9 are views illustrating electronic devices 400 and 500 each including first and second display devices according to the exemplary embodiments.

Referring to FIG. 8, the electronic device 400 may include a first display device 410, a second display device 420, and a manipulation unit 430. The electronic device 400 may be a game console. The first and second display devices 410 and 420 may be the first and second display devices, respectively, of the display device of the above-described embodiments. For example, the first and second display devices 410 and 420 may include light sources emitting light having different chromaticity coordinate regions, and reflective sheets formed of different materials. Therefore, a color sensation difference between images displayed on the first and second display devices 410 and 420 may be minimized. At least one of the first and second display devices 410 and 420 may include a touch screen panel.

Referring to FIG. 9, the electronic device 500 may include first and second display devices 510 and 520. The electronic device 500 may be a cellular phone. The first and second display devices 510 and 520 may be the first and second display devices, respectively, of the display device of the above-described embodiments. For example, the first and second display devices 510 and 520 may include light sources emitting light having different chromaticity coordinate regions, and reflective sheets formed of different materials. Therefore, a color sensation difference between images displayed on the first and second display devices 510 and 520 may be minimized. At least one of the first and second display devices 510 and 520 may include a touch screen panel. In an embodiment, one of the first and second display devices 510 and 520 may display a manipulation screen such as a keypad screen.

As described above, according to the exemplary embodiments, the display device includes the first backlight assembly and the second backlight assembly. The first backlight assembly includes the first light source configured to emit first light, and the first reflective sheet configured to reflect the first light toward the first display panel. The second backlight assembly includes the second light source configured to emit second light, and the second reflective sheet configured to reflect the second light toward the second display panel. The second reflective sheet includes a material different from a material of the first reflective sheet. Therefore, lights having substantially the same chromaticity coordinate regions may be input to the first and second display panel. As such a color sensation difference between images displayed on the first and second display panels may be minimized.

By way of summation and review, the development of electronic devices such as game consoles has increased demand for display devices having a plurality of display panels. In the case of a display device having a plurality of display panels, colors of the same image may be differently displayed in each of the plurality of display panels. Therefore, research is being conducted to minimize color differences between images displayed on the plurality of display panels.

Embodiments, e.g., the exemplary embodiments discussed above, relate to a highly reliable display device. The embodiments further relate to a display device configured to minimize a color sensation difference among images displayed on a plurality of display panels.

The above-disclosed subject matter is to be considered illustrative and not restrictive, and the appended claims are intended to cover all such modifications, enhancements, and other embodiments, which fall within the true spirit and scope of the inventive concept. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Thus, to the extent allowed by law, the scope of the inventive concept is to be determined by the broadest permissible interpretation of the following claims and their equivalents, and shall not be restricted or limited by the foregoing detailed description.

What is claimed is:

1. A display device, comprising:
   first and second display panels adjacent to each other;
   a first backlight assembly including a first light source configured to emit a first light and a first reflective sheet configured to reflect the first light; and
   a second backlight assembly including a second light source configured to emit a second light and a second reflective sheet configured to reflect the second light, the second reflective sheet including a second material that is different from a first material of the first reflective sheet,
   wherein the first reflective sheet reflects the first light as third light toward the first display panel, and the second reflective sheet reflects the second light as fourth light toward the second display panel,
   wherein a chromaticity coordinate region of the second light is different from a chromaticity coordinate region of the first light,
   wherein a chromaticity coordinate region of the third light and a chromaticity coordinate region of the fourth light are substantially the same.

2. The display device of claim 1, wherein:
   the first display panel includes a first thin film transistor substrate and a first color filter substrate on the first thin film transistor substrate, and
   the second display panel includes a second thin film transistor substrate and a second color filter substrate on the second thin film transistor substrate, the first and second color filter substrates include color filters formed of a same material.

3. The display device of claim 1, wherein:
   the chromaticity coordinate region of the first light is different from the chromaticity coordinate region of the third light, and
   the chromaticity coordinate region of the second light is different from the chromaticity coordinate region of the fourth light.

4. The display device of claim 1, wherein:
   the chromaticity coordinate region of the first light is substantially equal to the chromaticity coordinate region of the third light, and
   the chromaticity coordinate region of the second light is different from the chromaticity coordinate region of the fourth light.

5. The display device of claim 1, further comprising:
   a third display panel adjacent to the first and second display panels,
   a third backlight assembly including a third light source configured to emit fifth light and a third reflective sheet configured to reflect the fifth light, and
   the third reflective sheet reflects the fifth light as six light toward the third display panel, and the third reflective sheet includes a third material that is different from at least one of the first material of the first reflective sheet and the second material of the second reflective sheet.

6. The display device of claim 5, wherein:
   a chromaticity coordinate region of the fifth light is different from at least one of the chromaticity coordinate region of the first light and the chromaticity coordinate region of the second light, and
   the chromaticity coordinate regions of the third light, the fourth light, and the six light are substantially the same.

7. The display device of claim 5, wherein:
   the first display panel includes a first thin film transistor substrate and a first color filter substrate on the first thin film transistor substrate,
   the second display panel includes a second thin film transistor substrate and a second color filter substrate on the second thin film transistor substrate, and
   the third display panel includes a third thin film transistor substrate and a third color filter substrate on the third thin film transistor substrate,
   the first, second, and third color filter substrates include color filters formed of a same material.

8. The display device of claim 1, wherein the first and second light sources include a light emitting diode.

9. The display device of claim 1, wherein:
   the first backlight assembly includes a first light guide plate configured to guide the first light toward the first display panel and a first optical sheet disposed above the first light guide plate, the first light guide plate being disposed between the first reflective sheet and the first optical sheet, and
   the second backlight assembly includes a second light guide plate configured to guide the second light toward the second display panel and a second optical sheet disposed above the second light guide plate, the second light guide plate being disposed between the second reflective sheet and the second optical sheet.

10. A display device, comprising:
    first and second display panels adjacent to each other;

a first backlight assembly including a first light source configured to emit a first light and a first reflective sheet configured to reflect the first light toward the first display panel; and a second backlight assembly including a second light source configured to emit a second light and a second reflective sheet configured to reflect the second light toward the second display panel;

a reflectivity of the first reflective sheet for the first light in a predetermined wavelength band is greater than a reflectivity of the second reflective sheet for the second light in the predetermined wavelength band, wherein an intensity of a reflected first light in the predetermined wavelength band and an intensity of reflected second light in the predetermined wavelength band are substantially equal.

11. The display device of claim 10, wherein an intensity of the first light in the predetermined wavelength band is weaker than an intensity of the second light in the predetermined wavelength band.

12. The display device of claim 10, wherein the predetermined wavelength band is included in a visible wavelength band.

13. The display device of claim 10, wherein the reflectivity of the first reflective sheet is substantially equal to the reflectivity of the second reflective sheet in the other wavelength bands that exclude the predetermined wavelength band.

* * * * *